Nov. 27, 1928.

E. J. CASSELMAN

PROCESS OF AND APPARATUS FOR MAKING CLAY ARTICLES

Filed Aug. 24, 1926

INVENTOR
Elbridge J. Casselman
by his attys
Byrnes, Stebbins + Parmelee

Patented Nov. 27, 1928.

1,692,887

UNITED STATES PATENT OFFICE.

ELBRIDGE J. CASSELMAN, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

PROCESS OF AND APPARATUS FOR MAKING CLAY ARTICLES.

Application filed August 24, 1926. Serial No. 131,180.

This invention relates to the process of and apparatus for making of clay articles, and is particularly useful in the manufacture of tank blocks used for glass melting tanks and the like, although the invention has numerous other applications.

It has heretofore been proposed to make tank blocks from a clay mix which is plastic, such mix being pressed into a suitable mold. This process is open to a number of objections, and a casting process has been developed. By this casting process a sectional mold is made up of plaster of Paris and is provided with a gate similar to that used in metal founding. Clay slip is poured into this mold and after a proper time the mold is taken apart. This process is also open to numerous objections. For example, the plaster of Paris mold must be periodically renewed, and there is also a possibility of voids occurring in the blocks due to the fact that water leaves the cast block in all directions.

I provide for pouring a clay slip into a generally impervious mold having a porous wall. For example, a baked fireclay block may be used for a base and a rectangular mold made of metal or coated wood may be placed thereon. The clay slip is poured into this mold and the cast is covered to prevent or retard evaporation of water from the top surface. If desired, the pressure condition above the slip while it is in the mold may be varied during a part or a whole of the drying period so as to control, in a measure, the rate of drying.

The water leaves the slip due to absorption by the porous clay base block. After a time the side walls of the mold may be removed and the block may be cut into portions corresponding to the size and shape that is finally desired, with due allowance for further shrinkage.

In the accompanying drawings, which illustrate more or less diagrammatically the present preferred embodiment of my invention as applied to the manufacture of tank blocks,—

Figure 1:
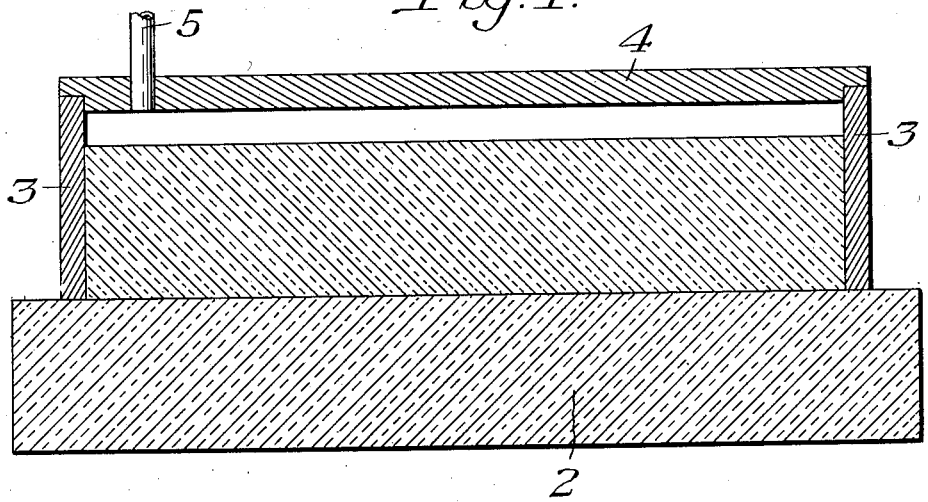
Figure 2:
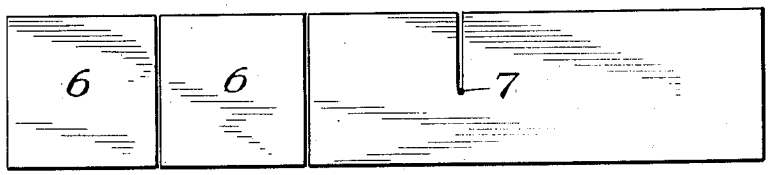

Figure 1 is a vertical section through a mold made according to my invention and showing a clay block as cast; and Figure 2 is a side elevation of the cast block in process of being cut into sections.

In the illustrated embodiment of the invention there is shown a mold base 2 which is a porous clay block of suitable size. A box-like frame 3 is placed on top of the base 2. This frame is preferably substantially impervious and is made of metal or coated wood. The various portions are preferably jointed so that they may be removed without injury to the cast block.

A clay slip is poured into the mold to a suitable depth. This slip may be of any desired mix. The following will serve as an example:

Dry materials.

| | Per cent. |
|---|---|
| Kaolin | 23 |
| Ball clay | 29 |
| Potter's flint | 25 |
| Old blocks, ground and screened | 20 |
| Feldspar | 3 |
| | 100 |

Liquid material.

Solution of 1% concentration sodium silicate in water 27% of above dry weight.

After the slip has been poured into the mold, a suitable cover 4 is applied. This cover is preferably waterproof to prevent the evaporation of water from the top surface. A pressure connection 5 is provided so that either sub- or super-atmospheric pressure may be maintained above the material in the mold during a part or the whole of the drying period.

The removal of water from the slip takes place through the bottom surface due to absorption of the water by the porous clay block 2. This block is, as above stated, a burned block and it preferably has a uniformly porous structure and a thickness which approximates the thickness of the blocks to be formed. It is found that a thinner base will not be as satisfactory.

After the block has become stiff enough to support its own weight and has shrunk sufficiently, the side walls 3 are removed and the block may then be cut into smaller blocks 6 of the approximate size and shape desired. This may be done, for example, by a wire 7.

The problem involved when working with clay is different than the problem involved when working with other materials which have no comparable drying or hardening shrinkage. The volume of shrinkage of the sample mix given above is somewhere between 15% and 20%, and for very free flowing clay slips there may be a volume shrinkage as high as 40%. These high volume shrinkages entail relatively high dimensional shrinkages as the moisture is removed from the clay slip during the solidification of the block. Where a mold having a substantially rigid base is employed, as shown for example in Figure 1 of the drawings, it is desirable that the surface of the block be smooth, as also shown in Figure 1. If a rough or irregular surface is left on the supporting block, the fluid slip will conform to the irregular surface of the supporting block and this tends to cause cracks when shrinkage takes place during the drying or hardening period.

By my process an improved block is produced at relatively low expense. The cost of plaster molds is done away with. Since a number of blocks will be cut from a single casting, and since the drying rate may be accurately controlled, a very uniform product results.

I have illustrated and described a preferred manner of carrying out my invention, but it will be understood that it is not thus limited since it may be otherwise embodied and practiced within the scope of the following claims.

I claim:

1. Apparatus for making clay articles, comprising a porous supporting block and a relatively impervious frame thereon, the block being substantially no thinner than the article to be cast.

2. Apparatus for making clay articles comprising a relatively impervious mold having a base made from a porous ceramic burned block.

3. Apparatus for making clay articles comprising a porous supporting block and a relatively impervious frame thereon, the face of the block which lies within the mold being substantially smooth.

4. The process of making clay articles, which comprises confining a clay slip so as to define an article of the desired size and shape, materially retarding absorption of water from at least some of the faces of the formed article, permitting absorption of water from one face thereof, and varying the pressure on the slip.

5. The process of making clay articles, which comprises confining a clay slip so as to substantially define the size and shape of the desired article, causing absorption of water from the slip through the bottom only of the formed article, and varying the pressure on the cast material.

6. Apparatus for making clay articles, comprising a relatively impervious mold having a porous ceramic base at least as thick as the article which is to be formed in the mold.

In testimony whereof I have hereunto set my hand.

ELBRIDGE J. CASSELMAN.